United States Patent
Tachibana

(10) Patent No.: US 6,697,119 B2
(45) Date of Patent: Feb. 24, 2004

(54) APPARATUS AND METHOD FOR CONVERTING FRAME RATES OF SIGNALS UNDER DIFFERENT SYSTEMS

(75) Inventor: Wataru Tachibana, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 418 days.

(21) Appl. No.: 09/771,552

(22) Filed: Jan. 30, 2001

(65) Prior Publication Data

US 2001/0050722 A1 Dec. 13, 2001

(30) Foreign Application Priority Data

Feb. 23, 2000 (JP) ........................................ 2000-046637

(51) Int. Cl.$^7$ ................................................. H04N 7/01
(52) U.S. Cl. ........................ 348/443; 348/459; 348/441
(58) Field of Search ................................ 348/441, 459, 348/443, 715, 497, 498, 567; 345/660, 603, 669; H04N 7/01, 11/20

(56) References Cited

U.S. PATENT DOCUMENTS 4,035,832 A * 7/1977 Stalley et al. ............... 348/497
5,117,289 A * 5/1992 Farley et al. ................ 348/443
6,268,890 B1 * 7/2001 Kawahara .................... 348/715

FOREIGN PATENT DOCUMENTS

| JP | 8-172573 | | 7/1996 |
| JP | 411252512 | * | 9/1999 |
| JP | 2001092429 | * | 4/2003 |

* cited by examiner

Primary Examiner—Sherrie Hsia
(74) Attorney, Agent, or Firm—Birch, Stewart, Kolasch & Birch, LLP

(57) ABSTRACT

A data rate conversion apparatus of the present invention is a data rate conversion apparatus, comprising: an information input device for receiving frame information at a first data rate; an information storage memory including a plurality of buffers for storing the frame information; a write control device for selecting one of the buffers to which the frame information is to be written, and writing the frame information to the selected buffer; a read control device for selecting one of the buffers from which the frame information is to be read, and reading the frame information from the selected buffer; and an information output device for outputting the frame information, which is read by the read control device, at a second data rate which is different from the first data rate.

11 Claims, 4 Drawing Sheets

APPARATUS AND METHOD FOR CONVERTING FRAME RATES OF SIGNALS UNDER DIFFERENT SYSTEMS

BACKGROUND OF THE INVENTION

1. Field of the Invention

The present invention relates to a method and apparatus for converting a data rate including, for example, converting frame rates of video signals under different systems.

2. Description of the Related Art

The NTSC system and PAL system are widely used video signal systems. A frame rate of video signals under the NTSC system and a frame rate of video signals under the PAL system are different. Herein, a "frame rate" refers to a time period required for displaying one screen.

The frame rate under the NTSC system is about 30 frames/second ($\frac{1}{30}$ second cycle). (Precisely, the frame rate is 30×1000/1001 frames/second.) The frame rate under the PAL system is 25 frames/second ($\frac{1}{25}$ second cycle). Therefore, when video signals under the NTSC system are attempted to be displayed under the PAL system, or when video signals under the PAL system are attempted to be displayed under the NTSC system, the frame rate should be converted.

As a conventional method for converting a data rate, Japanese Laid-Open Publication No. 8-172573 discloses a method for converting low rate data frames to high rate data fields, where 1 frame=2 fields, and 1 screen=1 frame.

In Japanese Laid-Open Publication No. 8-172573, the data rate is converted through the following steps. A basic field repetition rate such that fields are repeated a number (i.e., integer) of times during one frame period is determined based on an acceleration ratio i.e., a ratio of a high rate to a low rate. Then, a differential of a ratio between repetition rates is calculated by subtracting a ratio of the number of fields in one frame period to the low rate from the acceleration ratio. A differential of the field repetition rate and the differential of the ratio are compared; if they vary with respect to each other, a field is added or deleted to convert the data rate.

In accordance with the prior art described above, a frame rate of video signals under the PAL system (25 frames/second) is converted to a field rate of video signals under the NTSC system (about 60 fields/second) in the following manner. By calculating the repetition rate with the method according to the prior art described above, based on an acceleration ratio, i.e., a ratio of the data rate under the PAL system and the data rate under the NTSC system (60/25= 2.4), the repetition rate is determined to be 2 fields and 3 fields. A differential calculation of the acceleration ratio is performed, and the number of fields to be repeated to account for the variation is calculated to be 2, 3, 2, 2, and 3 with the method according to the prior art described above.

FIG. 5 is a timing diagram showing the timing to perform the conversion of the data rate from the PAL system to the NTSC system. Based on the number of the fields to be repeated, 2, 3, 2, 2, 3, the data rate can be converted by outputting frames H1, H1, H2, H2, H2, H3, H3, H4, H4, H5, H5, H5 for the input frames H1 to H5.

However, in accordance with the prior art, the information having a low data rate (video signals under the PAL system, $\frac{1}{25}$ second cycle) can be converted to information having a higher data rate (video signals under the NTSC system, $\frac{1}{30}$ second cycle), but information having a high data rate cannot be converted to information having a lower data rate.

Also, as indicated by start time T1 of the input frame H1 in FIG. 5, the input frames (frames under the PAL system) and the output frames (frames under the NTSC system) should be synchronous.

SUMMARY OF THE INVENTION

According to one aspect of this invention, there is provided a data rate conversion apparatus, comprising: an information input device for receiving frame information at a first data rate; an information storage memory including a plurality of buffers for storing the frame information; a write control device for selecting one of the buffers to which the frame information is to be written, and writing the frame information to the selected buffer; a read control device for selecting one of the buffers from which the frame information is to be read, and reading the frame information from the selected buffer; and an information output device for outputting the frame information, which is read by the read control device, at a second data rate which is different from the first data rate.

In one embodiment of the invention, the data rate conversion apparatus further comprises an input termination detection input device for outputting a frame information termination signal indicating a termination of an input of the frame information to the information input device, wherein the write control device selects one of the buffers to which frame information is to be input next in response to the frame information input termination signal, and holds a first selected buffer information indicating the selected buffer.

In one embodiment of the invention, the write control device selects one of the buffers for a buffer to which frame information to be input next is to be written, the buffer being other than the buffer to which frame information, which has been input to the information input device, is written and the buffer from which the read control device is reading the frame information.

In one embodiment of the invention, the read control device selects one of the buffers from which frame information to be output next is read, and holds a second selected buffer information indicating the selected buffer.

In one embodiment of the invention, the read control device selects the buffer to which the frame information, which has been input to the information input device, is written for a buffer from which next output frame information is to be read.

In one embodiment of the invention, the data rate conversion apparatus further comprises an input synchronization detection device for outputting a first synchronization signal corresponding to the first data rate, wherein the write control device writes frame information to be input next to the buffer indicated by the first selected buffer information, in response to the first synchronization signal.

In one embodiment of the invention, the data rate conversion apparatus further comprises an output synchronization detection device for outputting a second synchronization signal corresponding to the second data rate, wherein the read control device reads frame information to be output next from the buffer indicated by the second selected buffer information, in response to the second synchronization signal.

In one embodiment of the invention, the first synchronization signal includes a signal indicating a timing to start an input of the frame information to be input next.

In one embodiment of the invention, the second synchronization signal includes a signal indicating a timing to start an output of the frame information to be output next.

In one embodiment of the invention, the information storage memory includes three buffers.

According to one aspect of the present invention, at the time when an input of information of one frame from the information input device terminates, a buffer to which the next input information is to be written and a buffer from which the next output information is to be read are selected. The write control device writes the information to the selected buffer at the next input frame start time, and the read control device reads the information of the selected buffer at the next output frame start time.

Thus, the invention described herein makes possible the advantages of (1) providing an apparatus which, with a single structure, can convert input information having an arbitrary data rate to output information having another arbitrary data rate, whether converting from a lower rate to a higher rate or vice versa; and (2) providing an apparatus with which it is possible to convert data rates even when input information and output information are asynchronous.

These and other advantages of the present invention will become apparent to those skilled in the art upon reading and understanding the following detailed description with reference to the accompanying figures.

DESCRIPTION OF THE PREFERRED EMBODIMENTS

Hereinafter, preferred embodiments of the present invention will be described with reference to FIGS. 1 to 4.

Figure 1:
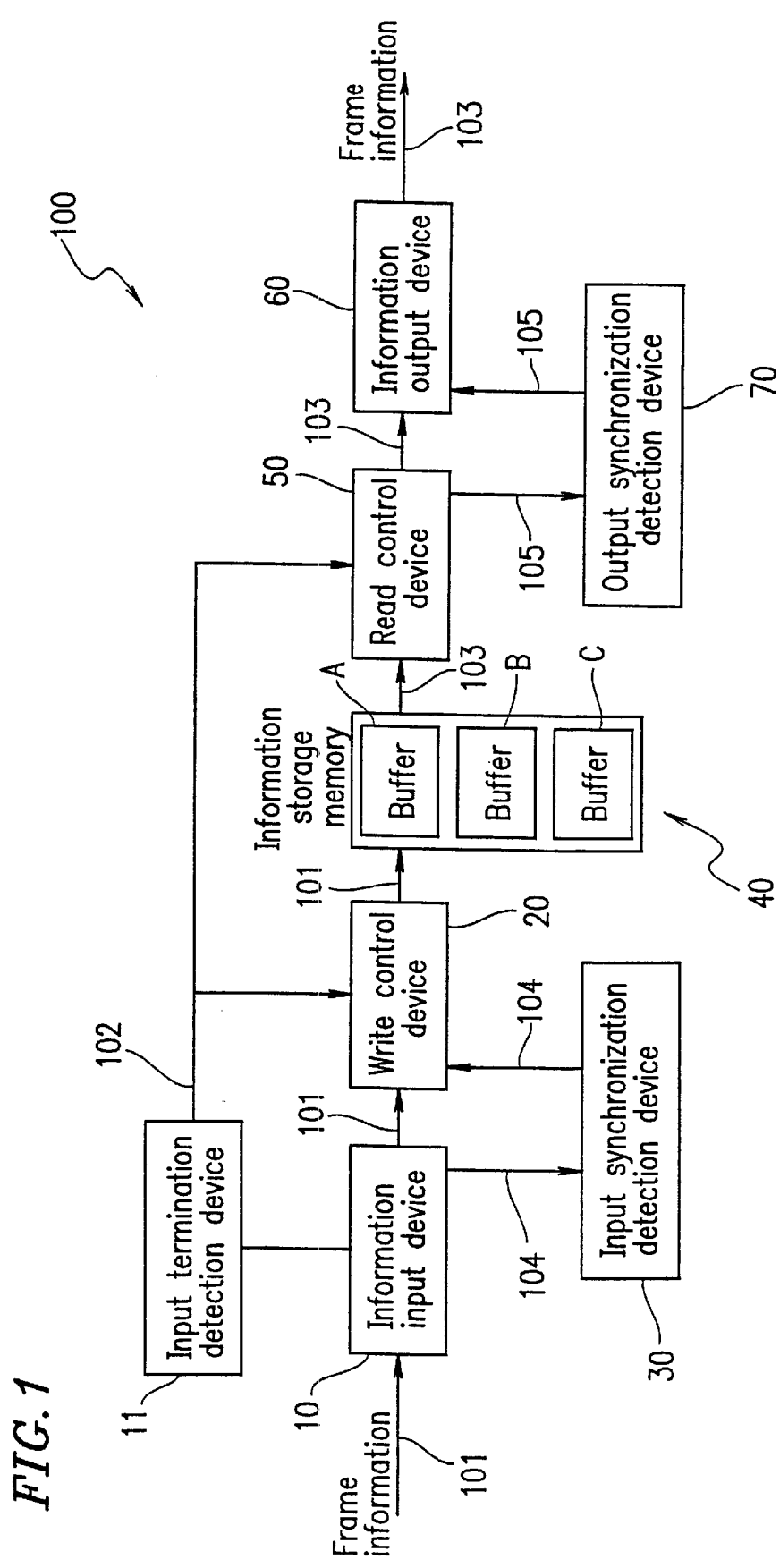
FIG. 1 is a block diagram of a frame rate conversion apparatus according to an embodiment of the present invention.
Figure 2:
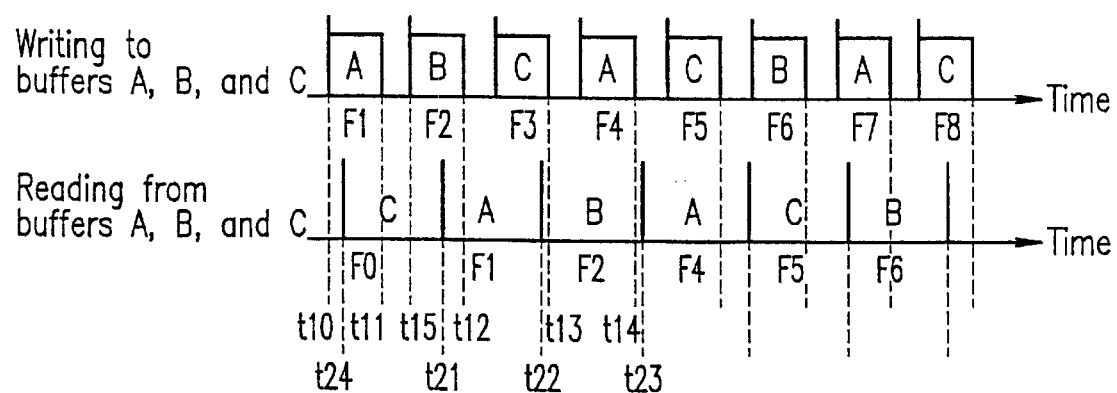
FIG. 2 is a timing diagram showing buffers in use during a data rate conversion from video signals under the NTSC system to video signals under the PAL system according to the embodiment of the present invention.

FIG. 1 is a block diagram showing a structure of a data rate conversion apparatus 100 in accordance with the present invention. The data rate conversion apparatus 100 converts frame information having an arbitrary data rate to frame information having another arbitrary data rate. FIG. 2 is a diagram explaining a data rate conversion from a data rate of video signals (frame information) under the NTSC system to a data rate of video signals (frame information) under the PAL system in accordance with the structure shown in FIG. 1.

The data rate conversion apparatus 100 in FIG. 1 includes an information input device 10, an input termination detection device 11, a write control device 20, an input synchronization detection device 30, an information storage memory 40, a read control device 50, an information output device 60, and an output synchronization detection device 70. The information storage memory 40 includes buffers A, B and C.

Frame information 101 which is input at a first data rate to the information input device 10 is written to one of the buffers A, B and C in the information storage memory 40. The particular buffer A, B, or C is selected by the write control device 20.

The write control device 20 selects the buffer to which the frame information 101 is to be written in the following manner. The write control device 20, in response to an input termination detection signal 102 detected by the input termination detection device 11 at the termination time of the input of the frame information 101 to the information input device 10, selects one buffer from buffers A, B, and C for the buffer to which the frame information 101 is to be written. The selected buffer is other than the buffer to which the frame information 101, which has been input by the input termination time, is written and the buffer from which the read control device 50 is reading frame information 103. The write control device 20 holds a first selected buffer information, which indicates the selected buffer, until the next selection is performed.

At the start time of the input of the frame information 101, in response to a synchronization signal 104 detected by the input synchronization detection device 30, the write control device 20 selects the buffer indicated by the first selected buffer information which is held by the write control device 20, and writes the frame information 101 to the selected buffer.

The read control device 50 selects one of the buffers A, B and C in the information storage memory 40, and reads the frame information 103 from the selected buffer. The information output device 60 outputs the frame information 103 at a second data rate.

With reference to the timing diagram shown in FIG. 2, the case where the frame information having a data rate under the NTSC system is converted to the frame information having a data rate under the PAL system will be described.

Frame information F1, which is input to the information input device 10 as an initialization process, is written to the buffer A by the write control device 20. Frame information F0 to be output is read from the buffer C by the read control device 50.

The frame information F2 is input to the information input device 10. In response to the input termination detection signal 102 detected by the input termination detection device 11 at time t11 when the input of the frame information F1 to the information input device 10 terminates, the write control device 20 selects the buffer B from three buffers A, B, and C for the buffer to which the frame information F2 is to be written at the time t11. The buffer B is the buffer other than the buffer A to which the frame information F1 is written and the buffer C from which the frame information F0 is being read. The write control device 20 holds the information indicating buffer B as first selected buffer information.

The frame information F1 is written to the buffer A upon being input to the information input device 10. The read control device 50 then selects the buffer A for the buffer from which the frame information 103 is to be read. The frame information 103 is then read and output to the information output device 60. The read control device 50 holds the information indicating the buffer A as second selected buffer information.

The frame information F2 to be input next is written to the buffer B in response to the synchronization signal 104 detected by the input synchronization detection device 30 at input start time t15 of the frame information F2. The buffer B is the buffer indicated by the first selected buffer information which is held by the write control device 20.

The frame information 103 to be output next is read from the buffer A in response to the synchronization signal 105 detected by the output synchronization detection device 70 at output start time t21 of the frame information F1. The frame information 103 is then read and output to the information output device 60. The buffer A is indicated by the second selected buffer information which is held by the read control device 50.

The frame information F2 is written to the buffer B. The frame information F3 is input to the information input device 10 next. At information input termination time t12 of the frame information F2, the write control device 20 selects the buffer C for the buffer to which the frame information F3 is to be written. The buffer C is the buffer other than the buffer B to which the frame information F2 is written and the buffer A from which the information is being read. The frame information F2 is written to the buffer B upon being input to the information input device 10. The read control device 50 then selects the buffer B for the buffer from which the frame information 103 is to be read. The frame information 103 is then read and output to the information output device 60.

The frame information F3 is written to the buffer C upon being input to the information input device 10. At information input termination time t13, the read control device 50 selects the buffer C for the buffer from which the frame information F3 is to be read. The frame information F3 is then read and output to the information output device 60.

However, the input of the frame information F4 terminates at time t14 which is prior to the start time t23 of the next output frame. The frame information is written to the buffer A upon being input to the information input device 10. The read control device 50 then additionally selects the buffer A for the buffer from which the frame information is to be read. The frame information 103 is then read and output to the information output device 60. Therefore, two frames of the input information (the frame information F3 and the frame information F4) are stored in the buffers A and C, respectively, but the frame information F3 stored in the buffer C is not output and only the information of the most recent frame (the frame information F4) is output.

As shown in FIG. 2, the data rate can be converted by outputting the frame information F1, F2, F4, F5, and F6 having a data rate under the PAL system for the frame information F1 to F6 having a data rate under the NTSC system.

Figure 3:
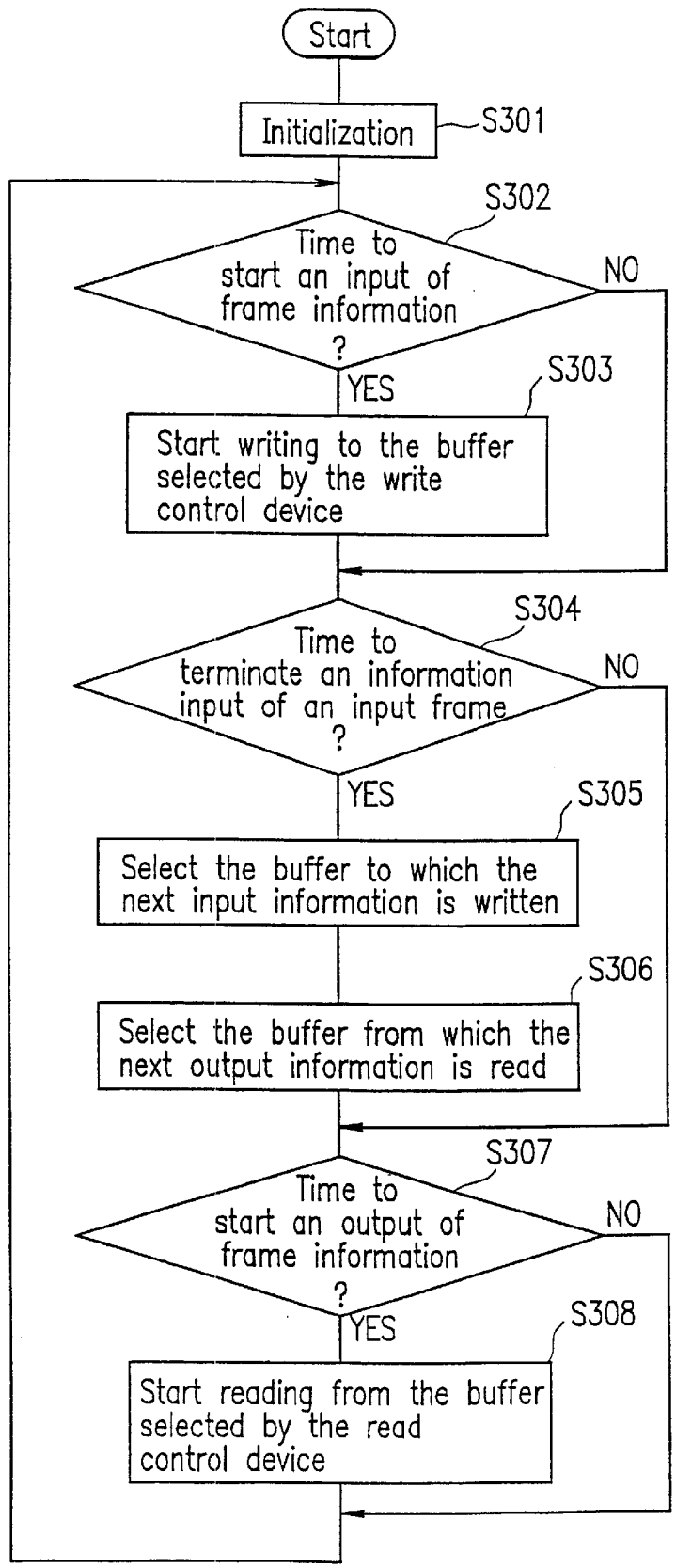
FIG. 3 is a flow chart showing an operation of the frame rate conversion apparatus according to the embodiment of the present invention.

FIG. 3 is a flow chart illustrating the operation of the data rate conversion apparatus 100 according to an embodiment of the present invention. As the initialization process, the write control device 20 selects the buffer A for the buffer to which the frame information to be input first is to be written. The read control device 50 selects the buffer C for the buffer from which the frame information to be output first is to be read. (S301)

The write control device 20 determines whether it is time to start the input of the frame information (S302). When it is determined that it is time to start the input of the frame information (YES at S302), the write control device 20 starts writing the input frame information to the selected buffer (S303).

When the write control device 20 determines that it is not the time to start the input of the frame information (NO at S302), or when the write control device 20 starts writing the input frame information to the selected buffer (S303), the write control device 20 determines whether the input of the frame information has terminated (S304).

When it is determined that the input of the frame information has terminated (YES at S304), the write control device 20 selects the buffer for the buffer to which the frame information to be input next is to be written (S305). The selected buffer is other than the buffer to which the frame information, which has been input to the information input device 10, is written and the buffer from which the read control device 50 is reading at that time. The frame information F1 is written to a buffer upon being input to the information input device 10. The read control device 50 then selects the buffer for the buffer from which the frame information is to be read (S306). The frame information is then read and output to the information output device 60.

When it is determined that the input of the frame information has not terminated (NO at S304), or the read control device 50 selects the buffer to which the most recent input frame information is written for the buffer from which the next output frame information is to be read (S306), the read control device 50 determines whether it is time to start the output of the frame information (S307).

When the read control device 50 determines that it is time to start the output of the frame information (YES at S307), the read control device 50 starts reading the frame information from the selected buffer (S308). Thereafter, the process will return to S302.

With reference to FIGS. 1, 2, and 3, an exemplary operation will be described.

The write control device 20 selects the buffer A for the buffer to which the frame information F1 to be input first is to be written. The read control device 50 selects the buffer C for the buffer from which the frame information to be output first is to be read (S301).

When it is determined that it is time t10 to start the input of the frame information F1 (YES at S302), the write control device 20 starts writing the frame input information to the selected buffer A (S303).

When it is determined that the input of the frame information F1 has terminated at the time t11 (YES at S304), the write control device 20 selects the buffer B for the buffer to which the frame information F2 to be input next is to be written. The buffer B is the buffer other than the buffer A to which the frame information F1, which has been input to the information input device 10, is written and the buffer C from which the read control device 50 is reading the frame information F0 at the time t11 (S305). The frame information is written to the buffer upon being input to the information input device 10. The read control device 50 then selects the buffer for the buffer from which the frame information is to be read (S306). The frame information is then read and output to the information output device 60.

When the read control device 50 determines that it is time t21 to start the output of the frame information (YES at S307), the read control device 50 starts reading the frame information F1 from the selected buffer A (S308).

With reference to the timing diagram of FIG. 4, the case where the frame information having the data rate under the PAL system is converted to the frame information having the data rate under the NTSC system will be described.

Frame information G1 to be input to the information input device 10 as an initialization process is written to the buffer A by the write control device 20. The frame information to be output is read from the buffer C by the read control device 50.

The frame information Gi is written to the buffer A. At time t31 when the input of the frame information G1 to the information input device 10 terminates, the write control device 20 selects the buffer B. The buffer B is the buffer other than the buffer A to which the frame information G1 is written, and the buffer C from which the frame information G0 is being read. The write control device 20 holds this information as the first selected buffer information. The read control device 50 selects the buffer A to which the input frame information G1 is written. The read control device 50 holds this information as the second selected buffer information. The frame information G2 is written to the buffer B. At time t32 when the input of the frame information G2 to the information input device 10 terminates, the read control device 50 selects the buffer B to which the input frame information G2 is written. The read control device 50 holds this information as the second selected buffer information.

However, the output of the next frame information is started at time t43 which is prior to the time t33 when the input of the frame information G3, which is to be input next to the information input device 10, terminates.

Therefore, the read control device 50 selects the buffer B again at the time t43, in accordance with the information held as the second selected buffer information (the information indicating the buffer B). As a result, the information output device 60 outputs the frame information G2 which is read out from the buffer B again.

Figure 4:
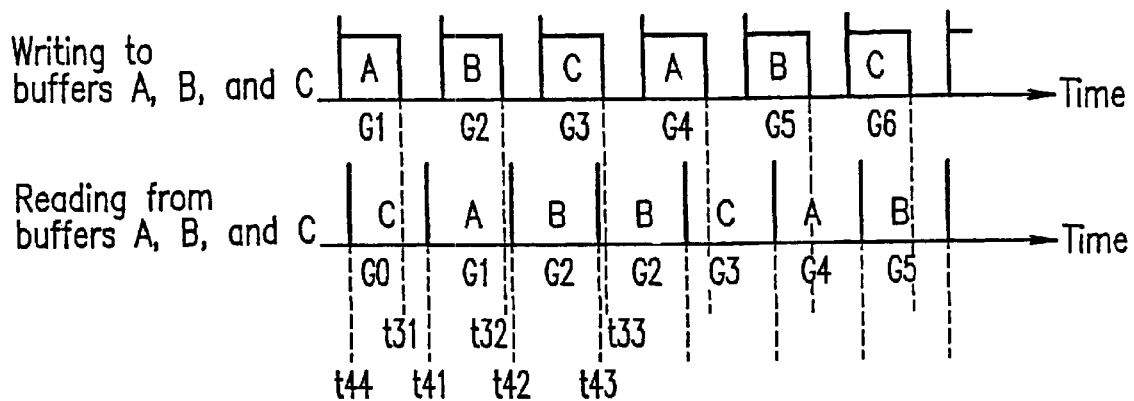
FIG. 4 is a timing diagram showing buffers in use during the data rate conversion from video signals under the PAL system to video signals under the NTSC system according to an embodiment of the present invention.
Figure 5:
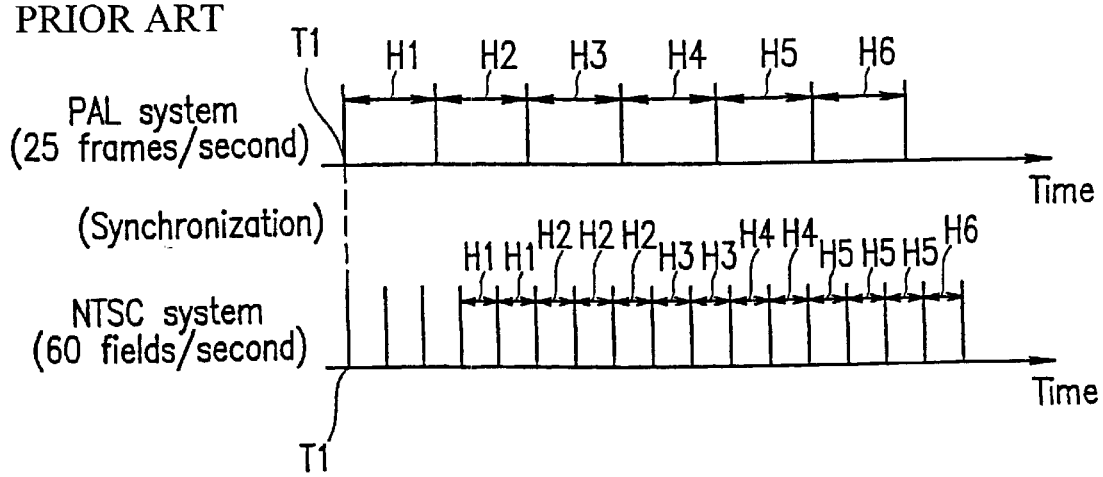
FIG. 5 is a timing diagram showing a frame rate conversion in accordance with the prior art.

As shown in FIG. 4, according to the present embodiment, the data rate can be converted by outputting the frame information G1, G2, G2, G3, G4, G5 having the data rate under the NTSC system for the frame information G1 to G5 having the data rate under the PAL system.

According to the present invention as described above, an apparatus which, with a single structure, can convert input information having an arbitrary data rate to output information having another arbitrary data rate can be provided, and, in addition, an apparatus with which the data rate can be converted even when the input information and the output information are asynchronous can be provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A data rate conversion apparatus, comprising:
   an information input device for receiving frame information at a first data rate;
   an information storage memory including a plurality of buffers for storing the frame information;
   a write control device for selecting one of the buffers to which the frame information is to be written, and writing the frame information to the selected buffer;
   a read control device for selecting one of the buffers from which the frame information is to be read, and reading the frame information from the selected buffer; and
   an information output device for outputting the frame information, which is read by the read control device, at a second data rate which is different from the first data rate,
   wherein the selected one of the buffers to be written to and the selected one of the buffers to be read from are selected at a time when one frame of the frame information inputted to the information input device terminates.

2. A data rate conversion apparatus according to claim 1, further comprising an input termination detection input device for outputting a frame information termination signal indicating the termination of an input of the frame information to the information input device, wherein the write control device selects one of the buffers to which frame information to be input next is written in response to the frame information input termination signal, and holds a first selected buffer information indicating the selected buffer.

3. A data rate conversion apparatus according to claim 2, wherein the write control device selects one of the buffers for a buffer to which frame information to be input next is to be written, the buffer being other than the buffer to which frame information, which has been input to the information input device, is written and the buffer from which the read control device is reading the frame information.

4. A data rate conversion apparatus according to claim 2, wherein the read control device selects one of the buffers from which frame information to be output next is read in response to the frame information input termination signal, and holds a second selected buffer information indicating the selected buffer.

5. A data rate conversion apparatus according to claim 4, wherein the read control device selects the buffer that the frame information, which has been input to the information input device, has just been written to for a buffer from which next output frame information is to be read from.

6. A data rate conversion apparatus according to claim 2, further comprising an inut synchronization detection device for outputting a first synchronization signal corresponding to the first data rate, wherein the write control device writes frame information to be input next to the buffer indicated by the first selected buffer information, in response to the first synchronization signal.

7. A data rate conversion apparatus according to claim 4, further comprising an output synchronization detection device for outputting a second synchronization signal corresponding the second data rate, wherein the read control device reads frame information to be output next from the buffer indicated by the second selected buffer information, in response to the second synchronization signal.

8. A data rate conversion apparatus according to claim 6, wherein the first synchronization signal includes a signal indicating a timing to start an input of the frame information to be input next.

9. A data rate conversion apparatus according to claim 7, wherein the second synchronization signal includes a signal indicating a timing to start an output of the frame information to be output next.

10. a data rate conversion apparatus according to claim 1, wherein the information storage memory includes three buffers.

11. A method for converting a data rate, the method comprising:
    receiving frame information at an information input device at a first data rate;
    storing the frame information in an information storage memory including a plurality of buffers;
    selecting one of the buffers to which the frame information is to be written and writing the frame information in the selected buffer;
    selecting one of the buffers from which the frame information is to be read and reading the frame information from the selected buffer; and
    outputting the frame information which is read at a second data rate which is different from the first data rate,
    wherein the selected one of the buffers to be written to and the selected one of the buffers to be read from are selected at a time when one frame of the frame information inputted to the information input device terminates.

* * * * *